US006857081B2

(12) United States Patent
Pohlman

(10) Patent No.: US 6,857,081 B2
(45) Date of Patent: Feb. 15, 2005

(54) APPARATUS SUITABLE FOR PROVIDING SYNCHRONIZED CLOCK SIGNALS TO A MICROELECTRONIC DEVICE

(75) Inventor: William Pohlman, Phoenix, AZ (US)

(73) Assignee: Primarion, Inc., Tempe, AZ (US)

( * ) Notice: Subject to any disclaimer, the term of this patent is extended or adjusted under 35 U.S.C. 154(b) by 572 days.

(21) Appl. No.: 09/771,755

(22) Filed: Jan. 29, 2001

(65) Prior Publication Data

US 2002/0162041 A1 Oct. 31, 2002

Related U.S. Application Data

(60) Provisional application No. 60/178,373, filed on Jan. 27, 2000.

(51) Int. Cl.[7] .............................. H04L 5/00; H04L 7/00; H03L 7/00
(52) U.S. Cl. ........................ 713/401; 713/400; 713/500; 713/503; 257/208; 327/161
(58) Field of Search ................................ 713/400, 401; 257/208, 203, 207, 210, 211, 723, 724, 776, 777, 778, 758; 327/295

(56) References Cited

U.S. PATENT DOCUMENTS

| 5,138,436 | A | | 8/1992 | Koepf | |
|---|---|---|---|---|---|
| 5,278,466 | A | | 1/1994 | Honoa et al. | |
| 5,523,622 | A | | 6/1996 | Harada et al. | |
| 5,532,500 | A | | 7/1996 | Okamura et al. | |
| 5,539,333 | A | | 7/1996 | Cao et al. | |
| 5,548,734 | A | | 8/1996 | Kolinski et al. | |
| 5,586,307 | A | | 12/1996 | Wong et al. | |
| 5,717,229 | A | | 2/1998 | Zhu | |
| 5,847,936 | A | | 12/1998 | Forehand et al. | |
| 5,861,764 | A | * | 1/1999 | Singer et al. | .................. 326/93 |
| 5,866,924 | A | * | 2/1999 | Zhu | .......................... 257/208 |
| 5,981,345 | A | * | 11/1999 | Ryum et al. | ................ 438/303 |
| 6,092,211 | A | * | 7/2000 | Hozumi | ...................... 713/500 |
| 6,184,736 | B1 | * | 2/2001 | Wissell et al. | .............. 327/295 |
| 6,211,703 | B1 | * | 4/2001 | Takekuma et al. | .......... 326/101 |
| 6,353,352 | B1 | * | 3/2002 | Sharpe-Geisler | ............ 327/295 |

FOREIGN PATENT DOCUMENTS

| EP | 0 813 134 A2 | | 12/1997 | |
|---|---|---|---|---|
| JP | 10097564 A | * | 4/1998 | ............. G06F/1/10 |

OTHER PUBLICATIONS

"Clock skew reduction in ASIC logic design: a methodology for clock tree management" Balboni, A.; Costi, C.; Pellencin, M.; Quadrini, A.; Sciuto, D.; CAD of Integrated CKts and Systems, IEEE Trans on, vol.: 17, Issue: 4, Apr. 1998, pp.:344–356.*

* cited by examiner

*Primary Examiner*—Lynne H. Browne
*Assistant Examiner*—James K. Trujillo
(74) *Attorney, Agent, or Firm*—Theodore E. Galanthay

(57) ABSTRACT

A device for transmitting clock signals to a microprocessor is disclosed. The device is configured to receive a clock signal and distribute the signal synchronically to multiple output sites on the device. The synchronized clock signals are transmitted from the various device sites to multiple sites on the microprocessor.

8 Claims, 1 Drawing Sheet

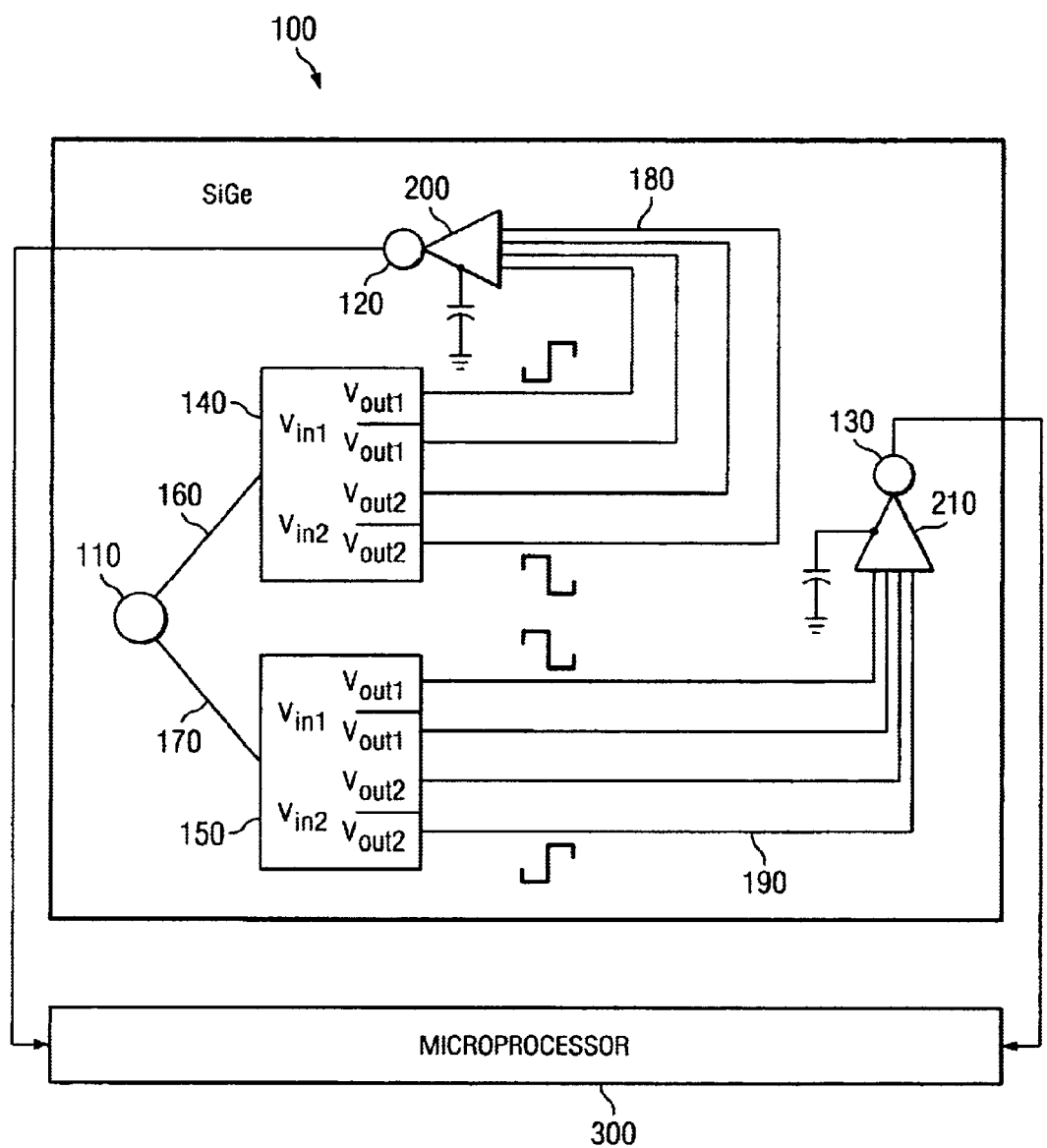

APPARATUS SUITABLE FOR PROVIDING SYNCHRONIZED CLOCK SIGNALS TO A MICROELECTRONIC DEVICE

CROSS REFERENCE TO RELATED APPLICATIONS

This application claims priority to U.S. Provisional Application Ser. No. 60/178,373, filed Jan. 27, 2000, entitled "Apparatus Suitable for Providing Synchronized Clock Signals to a Microelectronic Device."

TECHNICAL FIELD

The present invention generally relates to microelectronic devices. More particularly, the present invention relates to microelectronic circuits suitable for distributing clock signals.

BACKGROUND OF THE INVENTION

Clock signals are often distributed to portions of a microprocessor to provide synchronization between the various portions of the microprocessor. Microprocessor components such as flip-flops, state machines, and counters rely on such synchronization to step the components through various computations.

A clock signal typically originates at a source that is external to a microprocessor—e.g., at a quartz-crystal circuit on a computer motherboard. The clock signal is transmitted to the microprocessor at one or more points and travels via a clock network on the microprocessor to various clock sinks.

Generally, the clock network is configured to minimize any delay in propagation of the clock signal (clock skew) between various portions of the microprocessor. However, as microprocessors become increasingly integrated, it becomes increasingly more difficult to design the microprocessors with clock trees that minimize clock skew. Accordingly, improved methods and apparatus for reducing clock skew are desired.

SUMMARY OF THE INVENTION

The present invention provides improved apparatus for supplying synchronized clock signals to portions of an integrated circuit. The way in which the present invention addresses the deficiencies of now-known clock distribution systems is discussed in greater detail below. However, in general, the present invention provides an integrated circuit configured to provide synchronized clock signals to multiple sites on a microprocessor.

In accordance with one exemplary embodiment of the present invention, a clock signal distribution device is formed on a semiconductor substrate. The distribution device is configured to receive a clock signal and distribute synchronized clock signals to multiple locations within the device. In accordance with one aspect of this embodiment, the clock distribution device is formed on a compound semiconductor (e.g., SiGe) substrate to reduce phase noise associated with transmission of the clock signals.

In accordance with a further exemplary embodiment of the present invention, the clock distribution device is configured to couple to a microprocessor and provide synchronized clock signals to multiple locations on the microprocessor. In accordance with one aspect of this embodiment, the distribution device includes conductive bumps configured to facilitate coupling the device to the microprocessor.

BRIEF DESCRIPTION OF THE DRAWING

The drawing FIGURE is a schematic illustration of a clock signal distribution device in accordance with an exemplary embodiment of the present invention;

DETAILED DESCRIPTION OF EXEMPLARY EMBODIMENTS

The present invention generally relates to a microelectronic device configured to distribute clock signals. More particularly, the invention relates to an integrated circuit configured to provide synchronized clock signals to various sites. Although this invention may be used to provide synchronized clock signals to a variety of integrated circuits, the invention is conveniently described below in connection with providing the clock signals to a microprocessor.

An exemplary clock signal distribution device 100 in accordance with the present invention is schematically illustrated in the drawing FIGURE. As illustrated, device 100 includes a clock input 110, clock outputs 120 and 130, clock drivers 140 and 150, transmission lines 160, 170, 180, and 190, and receivers 200 and 210. Although device 100 is illustrated with a single input, two outputs, two drivers, and the like, device 100 may suitably include any number of inputs, outputs, drivers, lines, and the like.

In operation, device 100 receives a clock signal at input 110 and distributes the signal over lines 160 and 170 to drivers 140 and 150, respectively. Clock signals are then transmitted from drivers 140 and 150 over lines 180 and 190 to outputs 120 and 130.

Input 110 is generally configured to receive a clock signal—e.g. from a quartz circuit and transmit the signal to drivers 140 and 150. Accordingly, input 110 may be formed of any conductive material such as metal. In accordance with one exemplary embodiment of the invention, input 110 includes a solder bump formed using Controlled Collapse Chip Connection (C4) technology, and a clock input is received by device 100 through one or more conductive bumps.

In accordance with the present invention, drivers 140 and 150 are configured to facilitate clock signal transmission to receivers 200 and 210. Drivers 140 and 150 may include any driver suitable for amplifying a clock signal. In accordance with one exemplary embodiment, drivers 140 and 150 are configured to reduce phase noise associated with typical drivers. One exemplary driver configuration, designed to reduce phase noise, includes forming drivers 140 and 150 using compound semiconductor material such as silicon germanium (SiGe). For example, the drivers may be formed using SiGe substrates using Heterojunction Bipolar Transistor (HBT) technology. Alternatively, the drivers may be formed using a thin film of SiGe or other semiconductor or compound semiconductor material.

Transmission lines 160, 170, 180, and 190 are suitably configured to transmit clock signals between input 110 and outputs 120 and 130. Lines 160–190 may be formed of any conductive material. For example, lines 160–190 my be formed of aluminum, copper, or other conducting material. For example, lines 160–190 may be formed of doped semiconductor material.

Receivers 200 and 210 are configured to receive clock signals from drivers 140 and 150 and transmit the signals to outputs 120 and 130. Receivers 200 and 210 may include any circuit configured to receive a signal from drivers 140 and 150 and convert the signal for suitable transmission to a portion of the microprocessor. In accordance with an exemplary embodiment, receivers 200 and 210 are formed of SiGe based HBT transistors.

Outputs 120 and 130 are generally configured to receive clock signals from drivers 140 and 150. In accordance with one exemplary embodiment of the present invention, outputs 120 and 130 are further configured to electrically couple to portions of a microprocessor 300. One technique for coupling device 100 to the microprocessor 300 includes use of C4 technology bumps. Thus, in accordance with one exemplary embodiment, outputs 120 and 130 include C4 bumps.

Forming a clock distribution circuit, in accordance with an embodiment of the invention, on a separate substrate may be advantageous for several reasons. For example, clock networks formed on substrates separate from a microprocessor allow for higher clock speeds and less noise associated with the signal because the clock signals are transmitted through fewer active and passive devices, transmission lines can be shielded, microprocessor design can be simplified because clock signal routing does not need to be accounted for, and clock routing scheme layout scan be more readily optimized because microprocessor design criteria can be neglected or mitigated.

As noted above, device 100 is configured to provide synchronic clock signals to outputs 120 and 130. Accordingly, lines 160, 170 and 180, 190 are designed to have the same resistance-capacitance time delay (time delay is generally proportional to resistance*capacity in a line). In accordance with one exemplary embodiment of the invention, lines 180 and 190 are designed to have substantially the same resistance, capacitance, and length. Furthermore, transmission lines 180 and 190 may be configured to cancel noise from signals transmitted from multiple outputs of drivers 140 and 150.

Although the present invention is set forth herein in the context of the appended drawing FIGURE, it should be appreciated that the invention is not limited to the specific form shown. For example, while the invention is conveniently described above in connection with coupling the device to a microprocessor using bump technology, the device may be integral with the microprocessor or integral with one or more devices which are coupled to the microprocessor. Various other modifications, variations, and enhancements in the design and arrangement of the method and apparatus set forth herein may be made without departing from the spirit and scope of the present invention as set forth in the appended claims.

I claim:

1. A clock signal distribution device formed on a semiconductor substrate, comprising:

a clock input;

a first driver coupled to said clock input;

a second driver coupled to said clock input;

a first receiver coupled to said first driver by a first plurality of transmission lines;

a second receiver coupled to said second driver by a second plurality of transmission lines;

said first and second plurality of transmission lines being configured to provide substantially equal time delays;

said first receiver configured to provide a first output connected to a first site on a microprocessor; and said second receiver configured to provide a second output connected to a second site on said microprocessor.

2. A clock signal distribution device formed on a semiconductor substrate, as in claim 1, wherein said semiconductor substrate comprises:

silicon germanium.

3. A clock signal distribution device formed on a semiconductor substrate, as in claim 1, wherein said first and second plurality of transmission lines are configured to transmit both in phase and out of phase signals.

4. A clock signal distribution device formed on a semiconductor substrate, as in claim 1, wherein said clock input is configured as a solder bump.

5. A clock signal distribution device formed on a semiconductor substrate, as in claim 1, wherein said first and second outputs are configured as solder bumps.

6. An integrated circuit device formed on a semiconductor substrate and configured to provide synchronized clock signals to multiple sites on a utilization device located external to the semiconductor substrate, comprising:

a clock input configured as a solder bump;

a first driver coupled to said clock input;

a second driver coupled to said clock input;

a first receiver coupled to said first driver by a first plurality of transmission lines;

a second receiver coupled to said second driver by a second plurality of transmission lines;

said first and second plurality of transmission lines being configured to provide substantially equal time delays;

said first receiver configured to provide a first output connected to a first site on a utilization device; and said second receiver configured to provide a second output connected to a second site on said utilization device.

wherein said first and second outputs are configured as solder bumps connected to first and second sites on said utilization device.

7. An integrated circuit device as in claim 6, wherein said integrated circuit device is formed on a silicon germanium substrate.

8. An integrated circuit device as in claim 6, wherein said utilization device is a microprocessor.

* * * * *